US012593214B1

(12) United States Patent
Mathew et al.

(10) Patent No.: US 12,593,214 B1
(45) Date of Patent: Mar. 31, 2026

(54) CLOUD ACCESS TO COMMUNICATIONS AND/OR MEDIA BY AN INCARCERATED INDIVIDUAL VIA A VIRTUAL PRIVATE NETWORK SECURED PERSONAL COMMUNICATION AND/OR MEDIA DEVICE

(71) Applicant: Securus Technologies, LLC, Carrollton, TX (US)

(72) Inventors: Ligit Mathew, Flower Mound, TX (US); Melanie Sankaran, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/393,166

(22) Filed: Dec. 21, 2023

(51) Int. Cl.
 *H04W 12/37* (2021.01)
 *H04L 9/40* (2022.01)
 (Continued)

(52) U.S. Cl.
 CPC ......... *H04W 12/37* (2021.01); *H04L 63/0272* (2013.01); *H04W 12/086* (2021.01); *H04W 76/12* (2018.02)

(58) Field of Classification Search
 CPC .. H04M 3/2281; H04M 3/38; H04M 3/42221; H04M 2207/18; H04M 3/42;
 (Continued)

(56) References Cited

U.S. PATENT DOCUMENTS 9,806,940 B1 * 10/2017 Nielsen ............... H04L 12/4641
10,091,656 B1 * 10/2018 Hodge ................... H04L 63/102
 (Continued)

FOREIGN PATENT DOCUMENTS

WO WO-2023200878 A1 * 10/2023 ............. H04L 45/64

OTHER PUBLICATIONS

Phonio UK Ltd (Telio), "Secure Inmate Telephony (PIN Phone)", obtained online from <https://www.applytosupply.digitalmarketplace. service.gov.uk/g-cloud/services/515445746216934>, retrieved on Aug. 9, 2025 (Year: 2017).*

(Continued)

*Primary Examiner* — Zhimei Zhu
(74) *Attorney, Agent, or Firm* — Fogarty LLP

(57) ABSTRACT

An incarcerated individual communications and/or media access system may include a Virtual Private Network (VPN) secured personal incarcerated individual communication and/or media device and an incarcerated individual communications and/or media cloud access platform hosted by a computing cloud. The VPN secured personal incarcerated individual communication and/or media device includes an operating system incorporating a secured VPN as a (only) channel for the personal communication and/or media device to connect to any wireless carrier and a designation of a (n) (only) wireless carrier that the VPN secured incarcerated individual personal communication and/or media device is allowed to connect with and/or communicate through. The incarcerated individual communications and/or media cloud access platform receives communications terminated by the wireless carrier from, and to, the VPN secured personal incarcerated individual communication and/or media device and processes and/or controls the communications.

22 Claims, 3 Drawing Sheets

(51) Int. Cl.
H04W 12/086 (2021.01)
H04W 76/12 (2018.01)

(58) Field of Classification Search
CPC ......... H04M 1/72448; H04M 1/72463; H04M
1/72454; H04M 3/2218; H04M 3/42059;
H04M 3/42102; H04M 2203/60; H04M
2203/609; H04M 2203/6081; H04M
15/854; H04W 12/37; H04W 12/086;
H04W 12/08; H04L 63/20; H04L 63/30;
H04L 63/10; H04L 67/12; G06Q 50/26;
G06F 21/1064
See application file for complete search history.

(56) References Cited

U.S. PATENT DOCUMENTS

2013/0054962 A1\* 2/2013 Chawla ................ H04W 12/06
713/156

| | | | |
|---|---|---|---|
| 2016/0007201 A1\* | 1/2016 | Torgersrud | H04W 12/06 |
| | | | 455/411 |
| 2016/0044723 A1\* | 2/2016 | Sergeev | H04L 63/0272 |
| | | | 370/252 |
| 2016/0057624 A1\* | 2/2016 | Yang | H04W 4/60 |
| | | | 455/411 |
| 2023/0164113 A1\* | 5/2023 | Gupta | H04L 61/5061 |
| | | | 709/245 |
| 2023/0337019 A1\* | 10/2023 | Mehta | H04W 24/04 |
| 2024/0022932 A1\* | 1/2024 | Shahdad | H04W 24/08 |
| 2024/0388911 A1\* | 11/2024 | Vemuri | H04W 12/086 |

OTHER PUBLICATIONS

Antti Nykänen, "EVPN in Private Cellular Networks", Dec. 20, 2023, Master's Thesis. (Year: 2023).\*

\* cited by examiner

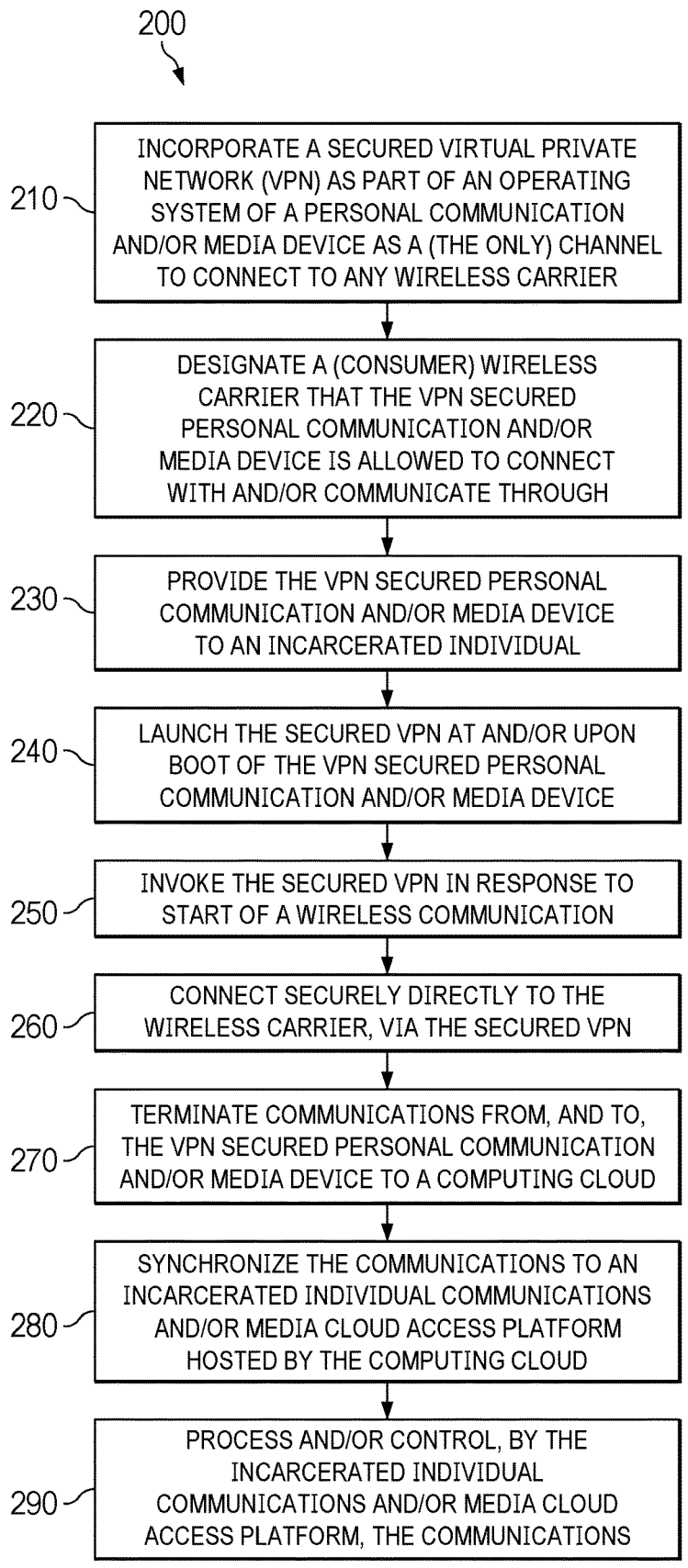

200

210 INCORPORATE A SECURED VIRTUAL PRIVATE NETWORK (VPN) AS PART OF AN OPERATING SYSTEM OF A PERSONAL COMMUNICATION AND/OR MEDIA DEVICE AS A (THE ONLY) CHANNEL TO CONNECT TO ANY WIRELESS CARRIER

220 DESIGNATE A (CONSUMER) WIRELESS CARRIER THAT THE VPN SECURED PERSONAL COMMUNICATION AND/OR MEDIA DEVICE IS ALLOWED TO CONNECT WITH AND/OR COMMUNICATE THROUGH

230 PROVIDE THE VPN SECURED PERSONAL COMMUNICATION AND/OR MEDIA DEVICE TO AN INCARCERATED INDIVIDUAL

240 LAUNCH THE SECURED VPN AT AND/OR UPON BOOT OF THE VPN SECURED PERSONAL COMMUNICATION AND/OR MEDIA DEVICE

250 INVOKE THE SECURED VPN IN RESPONSE TO START OF A WIRELESS COMMUNICATION

260 CONNECT SECURELY DIRECTLY TO THE WIRELESS CARRIER, VIA THE SECURED VPN

270 TERMINATE COMMUNICATIONS FROM, AND TO, THE VPN SECURED PERSONAL COMMUNICATION AND/OR MEDIA DEVICE TO A COMPUTING CLOUD

280 SYNCHRONIZE THE COMMUNICATIONS TO AN INCARCERATED INDIVIDUAL COMMUNICATIONS AND/OR MEDIA CLOUD ACCESS PLATFORM HOSTED BY THE COMPUTING CLOUD

290 PROCESS AND/OR CONTROL, BY THE INCARCERATED INDIVIDUAL COMMUNICATIONS AND/OR MEDIA CLOUD ACCESS PLATFORM, THE COMMUNICATIONS

FIG. 2

CLOUD ACCESS TO COMMUNICATIONS AND/OR MEDIA BY AN INCARCERATED INDIVIDUAL VIA A VIRTUAL PRIVATE NETWORK SECURED PERSONAL COMMUNICATION AND/OR MEDIA DEVICE

TECHNICAL FIELD

The present disclosure relates generally to communications and media access by residents of controlled-environment facilities, specifically to access to communications and/or media by incarcerated individuals via personal communication and/or media devices, and particularly to cloud access to communications and/or media by incarcerated individuals via virtual private network secured personal communication and/or media devices.

BACKGROUND

Generally, incarcerated individuals convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated.

During their incarceration, an incarcerated individual may have opportunities to communicate with the outside world. By allowing incarcerated individuals to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditionally communication services provide residents of controlled-environment facilities (such as incarcerated individuals in correctional facilities) an ability to place outbound phone calls to non-residents of the controlled-environment facility. Additionally, non-residents can typically schedule video visitation with residents (incarcerated individuals) of the controlled-environment facility. Other types of communication available to controlled-environment facility residents include the ability to exchange written, audio and video messages between residents and non-residents of the controlled-environment facility. Basically, all of these forms of communication aim to facilitate communication between a resident of a controlled-environment facility and a non-resident.

Typically, a correctional facility communication processing system provides telephone services, videoconferencing, online chat, and other communication services to incarcerated individuals. In some cases, this correctional facility communication processing system is co-located with the correctional facility. Alternatively, or additionally, an external centralized communications processing system may be deployed in a correctional facility vendor (e.g., a correctional facility communications provider) datacenter, or the like. That is, a correctional facility communication processing system may typically be centrally and/or remotely located with respect to one or more correctional facilities and/or may provide communication services to multiple correctional facilities. Such a correctional facility vendor datacenter may be connected to such facilities via a public network (e.g., the Internet) or a private network (e.g., intranet), or the like (e.g., via a secure tunneling protocol over the internet, using encapsulation). Thusly, such a correctional facility communication system may be configured to serve a variety of facilities and/or users, whether within or outside of a correctional facility. However, providing all the above services, particularly in a consolidated manner, within a controlled-environment facility is a challenge.

Residents may use more-or-less conventional telephones to access certain communication services or may use an incarcerated individual personal communication and/or media device. For example, personal computer wireless devices, such as tablet computing devices, smartphones, media players, wearables (e.g., smart watches), etc. are physically adapted for use by residents of the correctional facility (within the correctional facility). That is, each incarcerated individual personal communication and/or media device may be particularly and specifically manufactured or otherwise physically adapted for use in a controlled environment. Additionally, or alternatively, a resident may use a communal incarcerated individual communication and/or media terminal to place voice calls, as well as for video communication, execution of other apps, including media apps, games, job search apps, etc. Generally speaking, multiple incarcerated individual communal communication and/or media devices may be disposed in a correctional facility, as terminals, and may be disposed in a visitation room, in a pod, as part of a kiosk, or the like.

Under the control of the correctional facility communication processing system, such incarcerated individual personal communications and/or media devices may be capable of connecting to a non-resident's (i.e., a person not incarcerated in a correctional facility) telephone across a Publicly Switched Telephone Network (PSTN). For example, a telephony switch in the correctional facility communication processing system may be used to connect calls across a PSTN. Additionally, or alternatively, a network router in the correctional facility communication processing system to use an Integrated Services Digital Network (ISDN), Voice-over-IP (VOIP), or packet data network (such as, for example the Internet), or the like, may be used. That is, a telephony router of the correctional facility communication processing system may be used to route data packets associated with a call or data connection. Communications between an incarcerated individual and non-residents may include voice (audio), text, and/or video, which may be in the form of email, instant messaging, or the like.

Providing the above-discussed services involves installing application servers, specialized network appliances, access points to provide wireless connectivity, firewalls, etc., all of which have associated costs and time, and potentially could introduce security risks, in a controlled-environment, and particularly in a correctional facility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide an incarcerated individual communications and/or media access system that may include a Virtual Private Network (VPN) secured personal incarcerated individual communication and/or media device and an incarcerated individual communications and/or media cloud access platform hosted by a computing cloud.

The VPN secured personal incarcerated individual communication and/or media device includes an operating system (OS) incorporating a secured VPN as a (only) channel for the personal communication and/or media device to connect to any wireless carrier and a designation of a (an only) (consumer) wireless carrier that the VPN secured incarcerated individual personal communication and/or media device is allowed to connect with and/or communicate through. The VPN secured personal incarcerated individual communication and/or media device may invoke the secured VPN in response to start of a wireless communications application and/or an application program that makes use of wireless communications and connect securely directly to the wireless carrier, via the secured VPN. To such ends, the VPN secured personal incarcerated individual communication and/or media device may launch the secured VPN at or upon boot, in some implementations. The VPN secured personal incarcerated individual communication and/or media device may be a tablet computing device, a wearable, a smartphone, or the like, adapted as described.

The incarcerated individual communications and/or media cloud access platform receives, from the wireless carrier, communications terminated by the wireless carrier from, and to, the VPN secured personal incarcerated individual communication and/or media device and processes and/or controls the communications.

In various implementations of the present systems and methods terminating communications from, and to, the VPN secured personal communication and/or media device to the computing cloud may include the wireless carrier terminating communications from, and to, the VPN secured personal communication and/or media device to a computing cloud local zone or to a Content Delivery Network (CDN) Point-of-Presence (POP). In such implementations, the computing cloud synchronizes the communications to the incarcerated individual communications and/or media cloud access platform by the local zone, the content delivery network point-of-presence and/or the computing cloud synchronizing the communications from the local zone or CDN POP to the incarcerated individual communications and/or media cloud access platform.

Alternatively, terminating communications from, and to, the VPN secured personal communication and/or media device to the computing cloud may include the wireless carrier terminating communications from, and to, the VPN secured personal communication and/or media device to a wireless carrier network endpoint in the computing cloud. In these implementations the computing cloud synchronizes the communications to the incarcerated individual communications and/or media cloud access platform from the wireless carrier network endpoint.

In various implementations of the present systems and methods, processing and/or controlling the communications may include, by way of example, blocking or allowing a communication. This processing and/or controlling may be based, at least in part, on an identity of an incarcerated individual that the communication is from and/or to, a party the communication is from and/or to, a correctional facility (disciplinary) status of the incarcerated individual that the communication is from and/or to, one or more rules or regulations of the correctional facility, funds in a communications account of the incarcerated individual or other communication party, or the like. Also, in various implementations of the present systems and methods processing and/or controlling of the communications may include monitoring a communication.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
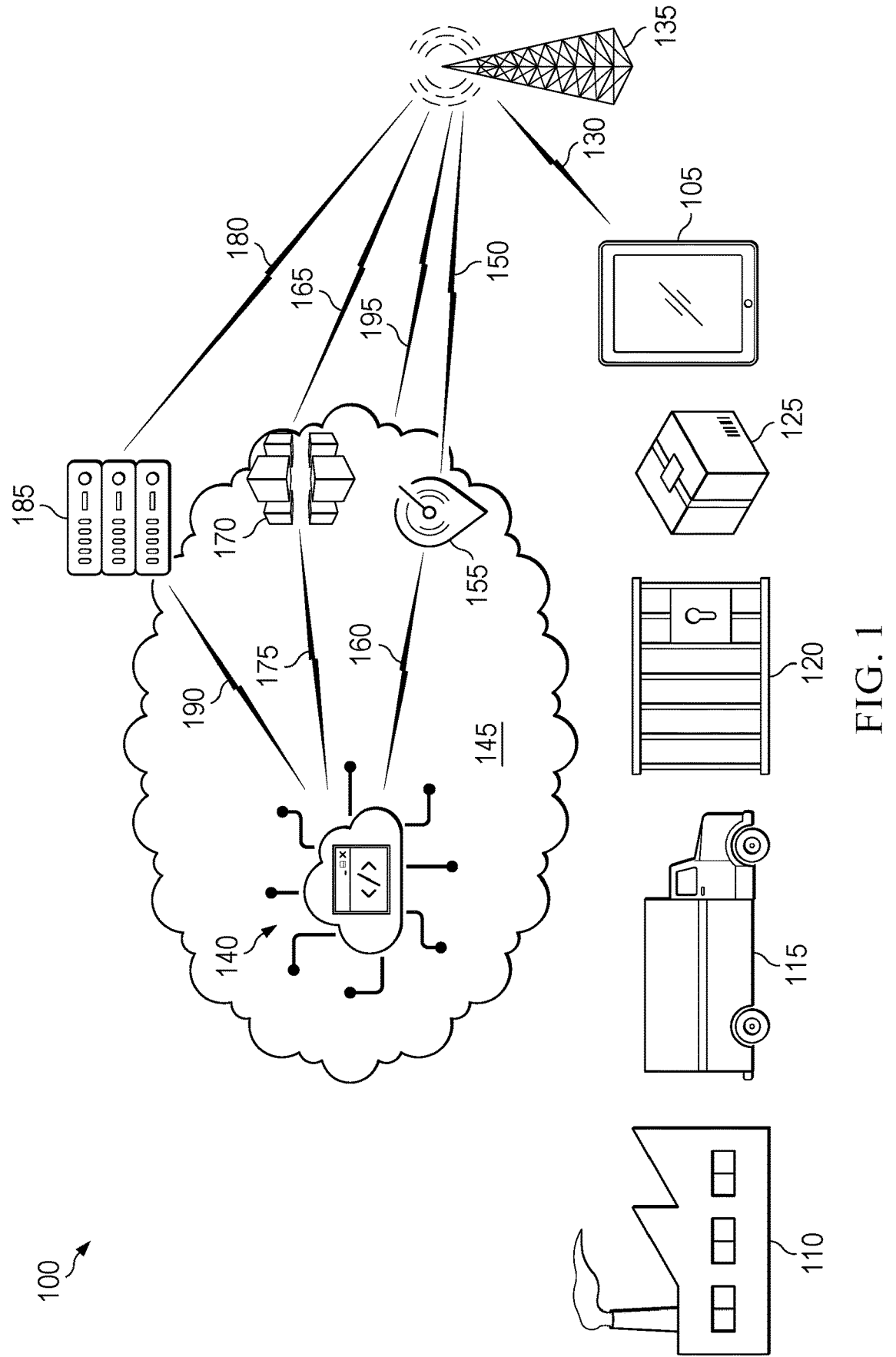
Figure 3:
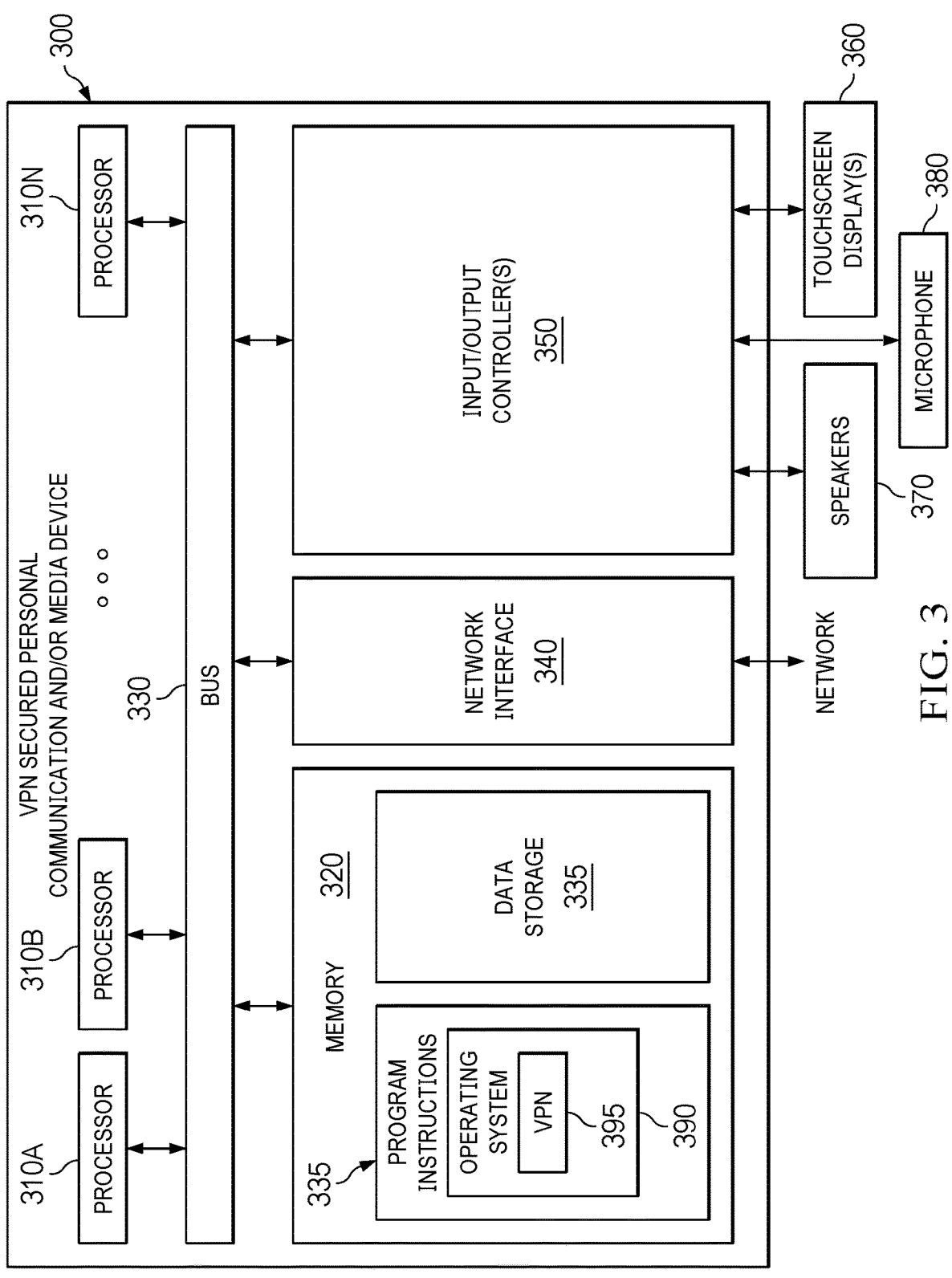

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for cloud access to communications and/or media by an incarcerated individual via a personal communication and/or media device Virtual Private Network (VPN), according to some embodiments;

FIG. 2 is a flowchart of an example process for cloud access to communications and/or media by an incarcerated individual, via a personal communication and/or media device VPN, in accordance with some embodiments; and FIG. 3 is a block diagram of a VPN secured personal communication and/or media device configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of correctional facilities are present in today's society. Examples of correctional facilities, correctional institutions or controlled environments may include, by way of example, municipal jails, county jails, state prisons, federal prisons, military stockades, juvenile facilities, detention camps, home incarceration environments, mental health facilities, rehabilitation centers, hospitals and the like. For convenience of explanation, various examples discussed herein are presented in the context of controlled environment facilities and their residents may be referred to as incarcerated individuals, arrestees, detainees, residents, patients or the like.

Moreover, as used herein, the term "controlled-environment facility" refers to any location for which there are restrictions on who can enter or leave. Additionally, there may be restrictions on what personal property, if any, is allowed within a controlled-environment facility. There are various types of controlled environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include incarcerated individuals, prisoners, guards, and staff in correctional facilities, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as incarcerated individuals, inmates, prisoners, arrestees, or detainees. It should be understood, however, that the systems and methods described herein may be similarly applicable to other types of controlled-environment facilities and their respective residents. Moreover, the systems and methods described herein may be used to support communications in other facilities that have fewer or no access restrictions. As used herein, the term "wireless communications," "wireless network," "consumer wireless communications," "consumer wireless provider," and/or the like refer to a typical consumer wireless (cellular) communications provider, such as AT&T, VERIZON, T-MOBILE, or the like, and their wireless (cellular) communications services and network. In contrast WI-FI, or similar terms are used to denote WLAN (wireless local area network) communications, and the like. Also, as used herein, the terms "cloud computing" and "computing cloud" refer to the sharing of computing resources among various clients to handle and provide certain services, such as, for example, data storage and applications. These services are delivered to those clients over a network, typically the Internet by a (on demand) cloud commuting provider (e.g., AWS). Heretofore, (consumer) wireless communications and cloud computing is expensive and cumbersome for use in the context of controlled-environment facilities, particularly correctional facilities, at least in part, due to security and other concerns. For example, unlike the population at large, incarcerated individual are limited with respect to what data and services they are (or should be) allowed to access. As a result, up until now, correctional facilities have generally not been able to enjoy the benefits of cloud computing and/or (consumer) wireless communications, particular with respect to their incarcerated individuals.

Embodiments of the present systems and methods are generally directed to communications and media access by residents of controlled-environment facilities, specifically to access to communications and/or media by an incarcerated individual via a personal communication and/or media device, and particularly to cloud access to communications and/or media by an incarcerated individual via a virtual private network (VPN) secured personal communication and/or media device. For example, an incarcerated individual communications and/or media access system may include a VPN secured personal incarcerated individual communication and/or media device and an incarcerated individual communications and/or media cloud access platform hosted by a computing cloud. The VPN secured personal incarcerated individual communication and/or media device may include an operating system incorporating a secured VPN as a (only) channel for the personal communication and/or media device to connect to any wireless carrier and a designation of a (n) (only) wireless carrier that the VPN secured incarcerated individual personal communication and/or media device is allowed to connect with and/or communicate through. The incarcerated individual communications and/or media cloud access platform receives communications terminated by the wireless carrier from, and to, the VPN secured personal incarcerated individual communication and/or media device and processes and/or controls the communications.

Embodiments of the present systems and methods deliver commissary services and technology services, including telecommunications, email, text, podcasts, e-books, music, games, apps, video, movies, written communications, audio and multimedia to and from incarcerated individuals (residents of correctional facilities or other secure facilities) using cloud-based solutions. Embodiments of the present systems and methods include hardware and software architecture for providing such services to incarcerated individuals. However, embodiments of the present systems and methods reduce typical capital expenditure on installation of equipment or computer hardware at the correctional facility and increases speed to market of embodiments of the present systems and methods for providing such services to incarcerated individuals. The architecture of the present systems and methods eliminates or reduces the need for acquisition and installation of infrastructure located at the correctional facility or secure facility, in that embodiments of the present systems and methods use Long-Term Evolution (LTE), 5G, Code Division Multiple Access (CDMA), Citizens broadband Radio Service (CBRS)/Private LTE (PLTE), or similar standards for wireless broadband communication for mobile devices and data terminals, based on European Telecommunications Standards Institute (ETSI) Global System for Mobile Communications (GSM)/Enhanced Data GSM Environment (EDGE) and Universal Mobile Telecommunications System (UMTS)/High Speed Packet Access (HSPA) standards. To wit, embodiments of the present systems and methods use publicly available (consumer) wireless carriers for wireless broadband communication for incarcerated individual mobile devices, correctional facility data and/or communication terminals, and the like.

In accordance with various embodiments, the present incarcerated individual wireless device will include all accessories for efficient distribution, including but not limited to, by way of example, listening apparatus such as ear buds or ear phones, keyboards, charging apparatus, wearables and product documentations.

Under embodiments of the present systems and methods, incarcerated individuals initiate, and receive, wireless broadband electronic communications namely LTE, 5G, CBRS/PLTE via portable computing devices, or similar VPN-enabled, tablets, smartphones, wearables, or the like. Depending on data latency requirements, or the like, electronic communications in accordance with embodiments of the present systems and methods are transmitted between on-demand cloud computing platform and Application Program Interface (API) local zones or network endpoints closest to incarceration facilities or directly from the cloud to the correctional facilities. Such on-demand cloud computing platform and API local zones are a type of infrastructure deployment that place compute, storage, database, and other select services closer to large population, industry, and IT centers.

While, as noted, deployment of a traditional correctional facility communications processing system at a correctional facility, and/or at a correctional facility communications provider datacenter, is not required under embodiments of the present systems and methods, some deployments of embodiments of the present systems and methods may call for installation of signal boosters at some incarceration facilities, such as depending on wireless carrier signal strength and in-facility coverage requirements for that particular facility. In some instances, wireless communications may be supplemented by a WLAN connection, under some embodiments.

Further various embodiments of the present systems and methods may include one or more tablet charging stations at correctional facilities, particularly those that lack individual electrical power outlets.

In various implementations of the present systems and methods, embodiments of the present VPN secured personal communication and/or media device s may be wall-mounted units. Such wall-mounted units may act as communal incarcerated individual communication and/or media devices.

In accordance with embodiments of the present systems and methods, electronic communications to and from the VPN secured personal communication and/or media devices are protected by a centralized (cloud-based) firewall with enhanced security features, remote from the correctional facilities. Further, a correctional facility communications provider may provide cloud-based data storage accounts corresponding to residents of one or more controlled-environment facilities, cloud-based storage and retrieval of communication records stored in data storage accounts associated with the residents or a non-resident. Such a correctional facility communications provider datacenter may be connected to the computing cloud via a private network (e.g., intranet), or the like (e.g., via a secure tunneling protocol over the internet, using encapsulation, or the like), and protected by a firewall in the datacenter.

Under various embodiments of the present systems and methods the incarcerated individual personal communications and/or media device is configured with an Operating System (OS) (e.g., the GOOGLE certified ANDROID OS), incorporating a secured virtual private network, securely connecting the personal communication and/or media device directly to the cloud. However, some embodiments of the present systems and methods may be backward-compatible to support existing incarcerated individual personal communication and/or media devices and/or hardware architecture located at correctional facilities.

FIG. 1 is a diagrammatic illustration of an example communications environment, wherein example embodiment 100 of the present systems and methods for cloud access to communications and/or media, by an incarcerated individual, via a persistent personal communication and/or media device VPN is illustrated, according to some embodiments.

Incarcerated individual communications and/or media access system 100 makes use of VPN secured personal incarcerated individual communication and/or media device 105 (e.g., a tablet computer, smartphone, wearable, or the like), which has an OS incorporating a secured VPN as a channel (e.g., as the only channel) for the personal communication and/or media device to connect to a (any) wireless carrier. However, in accordance with embodiments of the present systems and methods one (consumer) wireless carrier that the VPN secured incarcerated individual personal communication and/or media device is allowed to connect with, and/or otherwise communicate through, is designated, such as via embedded-Subscriber Identity/Identification Module (eSIM) provisioning. For example, personal incarcerated individual communication and/or media device 105 may only employ an eSIM, and have no provision for a physical SIM, or the like, thereby preventing swap-out a SIMM. Resultingly, the one (only) wireless carrier that the VPN secured personal communication and/or media device 105 is allowed to connect with and/or communicate through is designated, in such embodiments. VPN secured personal incarcerated individual communication and/or media device 105 is particularly and specifically adapted to launch the secured VPN on VPN secured personal communication and/or media device 105, at/upon boot of VPN secured personal communication and/or media device 105. Thusly, the VPN may be "always on," thereby, the VPN is persistent. Resultantly, VPN secured personal incarcerated individual communication and/or media device 105 invokes the secured VPN in response to start or launch of a wireless communications application and/or an application program that makes use of wireless communications.

In some embodiments of the present systems and methods vendor 110 may supply engineering, manufacturing and distribution 115 of the VPN secured personal communication and/or media devices directly to correctional facility sites 120, as well as related logistics and reverse logistics. This vendor may be a third party vendor with respect to the incarcerated individual communications vendor and correctional facility.

In various embodiments of the present systems and methods VPN secured personal communication and/or media devices 105 may be provided by the (third party) vendor, individually boxed 125 with accessories, such as listening apparatus such as ear buds or ear phones, keyboard, charging apparatus, wearable and product documentation, for efficient distribution at correctional facility 120.

As noted, embodiments of VPN secured personal communication and/or media devices 105 preferably have the latest respective OS (e.g., the GOOGLE certified ANDROID OS), incorporating a secured VPN as part of the OS as a channel (e.g., as the only channel or mechanism) for connecting to the (consumer) wireless carrier, thereby connecting securely directly to the wireless carrier under control of the incarcerated individual communications vendor. Thus, in accordance with the foregoing, when VPN secured personal incarcerated individual communication and/or media device 105 initiates communications, it connects 130 securely and directly to wireless carrier 135, via the secured VPN.

The wireless carrier 135 relays communications from, and to, VPN secured personal communication and/or media devices to an on-demand cloud computing platform and/or API or network endpoints. For example, depending on data latency requirements, or the like, incarcerated individual communications traffic is, in accordance with embodiments of the present systems and methods, either sent between on-demand cloud computing local zones and the incarcerated individual communications vendor platform and/or API(s) in the on-demand cloud or straight from the wireless carrier to the incarcerated individual communications vendor platform and/or API(s) in the on-demand cloud. That is, embodiments of present Incarcerated individual communications and/or media access system 100 also include incarcerated individual communications and/or media cloud access platform 140 hosted by computing cloud 145. Incarcerated individual communications and/or media cloud access platform 140 receives communications terminated thereto by wireless carrier from, and to, VPN secured personal communication and/or media device 105 for processing and/or control of these communications. That is, wireless carrier 135 terminates, communications from, and to, VPN secured personal communication and/or media device 105 to computing cloud 145.

For example, in various embodiments, wireless carrier 135 may terminate (150) these communications to computing cloud local zone 155. Therein, computing cloud 145 synchronizes the communications to incarcerated individual communications and/or media cloud access platform 140 by local zone 155, and/or computing cloud 145, synchronizing (160) the communications from local zone 155 to incarcerated individual communications and/or media cloud access platform 140.

Alternatively, wireless carrier 135 may terminate (165), communications from, and to, VPN secured personal communication and/or media device 105 to computing cloud point-of-presence (POP), (e.g., a Content Delivery Network (CDN)) 170 in (e.g., at an "edge" of) computing cloud 145. A POP is an artificial demarcation point or network interface point between communicating entities, such as may allow users to connect to the Internet. A POP typically houses servers, routers, network switches, multiplexers, and other network interface equipment, and is typically located in a data center. One example of cloud POP 170 may be AMAZON CLOUDFRONT, a CDN, which is a globally-distributed network of proxy servers to cache content, such as web videos or other bulky media, more locally to users, to improve access speed for downloading the content, and the like. In such embodiments, computing cloud 145 synchronizes (175) the communications to incarcerated individual communications and/or media cloud access platform 140 from computing cloud PoP 170.

In a further alternative, wireless carrier 135 may terminate (180), communications from, and to, VPN secured personal communication and/or media device 105 to network endpoint 185 in (e.g., at an "edge" of) computing cloud 145. Therein, computing cloud 145 synchronizes (190) the communications to incarcerated individual communications and/or media cloud access platform 140 from wireless carrier network endpoint 185.

In another alternative, wireless carrier 135 may terminate (195) communications from, and to, VPN secured personal communication and/or media device 105 directly to incarcerated individual communications and/or media cloud access platform 140, within computing cloud 145.

Further, incarcerated individual communications and/or media cloud access platform 140 hosted by computing cloud 145 may be configured to enable correctional facilities and/or their incarcerated individuals to use certain further cloud-based technologies. For example, the incarcerated individual communications and/or media cloud access platform may allocate a data storage account to each incarcerated individual, which the incarcerated individual may variously access via one or more apps on their VPN secured personal communication and/or media device 105. Broadly speaking, each account may be associated with a particular incarcerated individual so that no other incarcerated individual has access to the same account. However, investigators or other facility staff may have privileges such that they may be allowed to access all incarcerated individual s' accounts for example, for investigative purposes including manual or automated data mining, etc. In some implementations, as part of a user agreement, an incarcerated individual communications vendor providing incarcerated individual communications and/or media cloud access platform 140 may notify an incarcerated individual that their account is subject to monitoring by the pertinent authorities, although protected from other incarcerated individuals.

FIG. 2 is a flowchart of example process 200 for cloud access to communications and/or media by an incarcerated individual via a persistent personal communication and/or media device VPN, in accordance with some embodiments. Therein, at 210, a secured VPN is incorporated into (e.g., as part of) an OS of a personal communication and/or media device (e.g., a tablet computer, wearable, smartphone, or the like) as a channel (e.g., as the only channel) for the personal communication and/or media device to connect to a (consumer) wireless carrier, and such a (consumer) a wireless carrier (135) that the resulting VPN secured personal communication and/or media device (105) is allowed to connect with and/or otherwise communicate through is designated, at 220. As described above this designation may be implemented via embedded-Subscriber Identity/Identification Module (eSIM) provisioning. That is, the personal incarcerated individual communication and/or media device may only employ an eSIM, and have no provision for a physical SIM, or the like, thereby preventing swap-out a SIMM, and designating the one (only) wireless carrier that the VPN secured personal communication and/or media device is allowed to connect with and/or communicate through.

At 230 the VPN secured personal communication and/or media device(s) are provided to the incarcerated individual(s). As noted above, in some embodiments a vendor (110) may supply not only engineering, manufacturing (including, by way of example, incorporation of the VPN in the OS at 210), but also distribution (115) of the VPN secured personal communication and/or media devices directly to correctional facility sites (120), as well as related logistics and reverse logistics. Also, as noted, in various embodiments, the VPN secured personal communication and/or media devices may be provided by the (third party) vendor, individually boxed (125) with accessories, such as listening apparatus such as ear buds or ear phones, keyboards, charging apparatus, wearables and product documentations, for efficient distribution within the correctional facility. In accordance with the foregoing, embodiments of the present systems and methods provide VPN secured personal communication and/or media devices to incarcerated individuals with "zero" (i.e., minimal, or no) facility infrastructure, "zero" installation and "zero touch" onboarding.

At, or upon, boot of the VPN secured personal communication and/or media device, the secured VPN is launched at 240, on the VPN secured personal communication and/or media device, and thus, the VPN may be "always on" and persistent. In response to start of a wireless communications application and/or an application program that makes use of wireless communications, the VPN secured personal communication and/or media device invokes the secured VPN at 250. Thereby, the VPN secured personal communication and/or media device, securely and directly connects to the designated wireless carrier, via the secured VPN, at 260.

However, use of the VPN secured personal communication and/or media device may be limited based on security protocols. For instance, an incarcerated individual may be required to enter identification information, such as (including), a PIN (Personal Identification Number) before being allowed to use the device, such as for communications. An incarcerated individual may similarly be required to provide biometric verification, such as using a voice print, fingerprint, facial recognition, iris scan or other biometric indicator. Access to specific applications and services (e.g., communications) provided by the VPN secured personal communication and/or media device may also be limited to incarcerated individual based on security protocols, thus requiring additional verification, such as a password, prior to allowing access for the incarcerated individual.

The wireless carrier terminates communications from, and to, the VPN secured personal communication and/or media device to a computing cloud (145), at 270 and then the computing cloud synchronizes the communications to an incarcerated individual communications and/or media cloud access platform (140) hosted by the computing cloud, at 280.

For example, as discussed above, the (consumer) wireless carrier terminates (150) incarcerated individual communication or data traffic to a (nearest) location (155) in the cloud (e.g. an AWS Local Zone) for low latency transactions and content delivery. This on-demand cloud computing local zone then synchronizes (160) with the present incarcerated individual communications and/or media cloud access platform hosted in an on-demand cloud computing region. To wit, at 270, the wireless carrier may terminate communications to a computing cloud local zone and then the computing cloud may synchronize the communications to the incarcerated individual communications and/or media cloud access platform by the local zone, and/or the computing cloud, synchronizing the communications, from the local zone, to the incarcerated individual communications and/or media cloud access platform, at 280.

Alternatively, as also discussed above, the wireless carrier may, at 270, terminate (165), communications from, and to, the VPN secured personal communication and/or media device to a POP (e.g., a CDN) (170) (at an edge of the computing cloud). Then the computing cloud may synchronize (175) the communications, to the incarcerated individual communications and/or media cloud access platform, from the wireless carrier network endpoint, at 280.

In another alternative discussed above, at 270, the wireless carrier may, at 270, terminate (180), communications from, and to, the VPN secured personal communication and/or media device to a wireless carrier network endpoint (185) (at an edge of the computing cloud). Then the computing cloud may synchronize (190) the communications, to the incarcerated individual communications and/or media cloud access platform, from the wireless carrier network endpoint, at 280.

At 270, in a further alternative, also discussed above, the wireless carrier may terminate (195) communications from, and to, VPN secured personal communication and/or media device, directly to the incarcerated individual communications and/or media cloud access platform, within the computing cloud, thereby directly synchronizing the communications to the incarcerated individual communications and/or media cloud access platform, from the wireless carrier network endpoint, at 280.

At 290, the incarcerated individual communications and/or media cloud access platform processes and/or controls the communications. For example, the incarcerated individual communications and/or media cloud access platform may block, or allow a communication, based at least in part on the identity of an incarcerated individual that the communication is from and/or to, a (the other) party the communication is from and/or to, a correctional facility (disciplinary) status of the incarcerated individual that the communication is from and/or to, one or more rules or regulations of the correctional facility, lack of funding in a respective incarcerated individual or other party communications account maintained by the platform (140), or the like. For instance, the incarcerated individual communications and/or media cloud access platform may limit an incarcerated individual's communications to be with non-residents whose identities are listed in that incarcerated individual's Pre-Approved Contact (PAC) and/or Personal-Allowed Number (PAN) list. In some scenarios, the incarcerated individual communications and/or media cloud access platform may also enforce restrictions prohibiting an incarcerated individual from contacting certain individuals identified in a "do not contact" list. In various scenarios, the identity of a non-resident may be identified based on the phone number of the non-resident, the device presented for use by a non-resident and/or the email addresses or other accounts used by the non-resident. Each incarcerated individual's PAC, PAN, and/or do not contact list(s) may be stored, for example, in a cloud database maintained by the incarcerated individual communications and/or media cloud access platform. In certain scenarios, this, or another, database may also be used to store biometric information used to authenticate incarcerated individuals. In addition to PAC, PAN, and/or do not contact list(s), the incarcerated individual communications and/or media cloud access platform may also store other security profiles and rules that are applicable to each incarcerated individual. Additionally, a communication may be monitored at 290, as part of such processing and/or control of the communication. For example, the incarcerated individual communications and/or media cloud access platform may be configured to perform communication monitoring operations, such being configured to monitor and or record communication sessions (e.g., as electronic audio or video files).

Further, embodiments of the incarcerated individual communications and/or media cloud access platform may include, or may employ, a secure, web-based portal enabling individuals to store and transmit information, including forensic tools that analyze communications into and out of controlled-environment facilities, that assists law enforcement. Such a portal may be provided by a (centralized) investigative data aggregation and analysis functionality of the incarcerated individual communications and/or media cloud access platform, which may provide such investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), electronic communication notification, electronic communication monitoring (whether real-time or recorded, and whether monitoring a particular electronic communication or a plurality of electronic communications), call "barging," electronic communication control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web page (e.g. the aforementioned "portal") having menus comprising an investigator dashboard may be provided, to present and facilitate execution of various investigative operations. These investigative tools may log calls (e.g., as call detail records), so that an investigator may research them through an archive and may be provided access to internal and/or external criminal databases and/or other sources of useful information. This (centralized) investigative data aggregation and analysis functionality may, in accordance with embodiments of the present systems and methods, be configured to accept setup of alerts. Each such alert may be associated with particular data related to electronic communication, such as a particular incarcerated individual dialed telephone number or other data related to electronic communications that may be associated with an incarcerated individual associated with, or otherwise named, in the alert. In various embodiments, an alert can be activated based on a number of different of conditions. One such condition can be a series of dialed numbers, a specific time frame in which these numbers are dialed, a combination of communications to specific contacts, or the like. Word spotting can additionally, or alternatively identify keywords in a communication, which may activate an alert in accordance with embodiments of the present systems and methods.

In addition, embodiments of the present systems and methods for cloud access to communications and/or media by an incarcerated individual may also enable VPN secured personal communication and/or media devices to provide networking interconnection within the facility, either through embodiments of the present stems and methods using LTE, 5G, CBRS/PLTE, or similar connectivity, back into the facility, or WI-FI connectivity via the present persistent VPN. This may, in accordance with various embodiments, enable use of the VPN secured personal communication and/or media devices as a transmitting and receiving agent for inter-device communications and tracking.

Also, in accordance with some embodiments of the present systems and methods, the present VPN secured personal communication and/or media devices may track and sync with wearables. In addition to connecting directly, via a VPN, to a wireless carrier, the present VPN secured personal communication and/or media devices may, additionally or alternatively, enable establishing peer to peer networking for file transfer, which may avoid the use of the (consumer) wireless network for large file transfers.

The foregoing results in lower capital expenditure to implement incarcerated individual communications in a correctional facility, more quickly than typical systems and methods, such as those employing a traditional correctional facility communications processing system at a correctional facility and/or at a correctional facility communications provider datacenter. Likewise, such "zero installation" of VPN secured personal communication and/or media device connectivity reduces cost and increases the speed of such installation compared with traditional setup of traditional incarcerated individual personal communication and/or media devices. However, as noted, signal boosters may be needed within the subject correctional facility, such as based on wireless carrier signal strength and/or in-facility coverage requirements. Further, embodiments of the present systems and methods for providing cloud access to communications and/or media by an incarcerated individual via a personal communication and/or media device virtual private network provide a greater degree of security and mobility. For example, with respect to security, LTE based wireless networks benefit from proven security technology deployed in cellular networks, worldwide. Further, LTE is better designed for intra-network mobility with traffic management and controlled handovers, provides consistent network connectivity to devices in motion, and the like.

Further, initiation of the VPN at bootup on the VPN secured personal communication and/or media devices, such that the VPN is persistent and "always on," adds a (n) (additional) layer of protection against spoofing attacks, and the like. Also, a (single) centralized firewall with advanced security features may be implemented by the incarcerated individual communications and/or media cloud access platform (140) hosted by the computing cloud (145) in accordance with embodiments of the present systems and methods, improving network security at all agencies with lower cost compared to security measures, such as (separate) firewalls implemented on traditional correctional facility communications processing system at a correctional facility, and/or at a correctional facility communications provider datacenter. Further, use of consumer wireless carrier technology such as LTE, 5G, CBRS/PLTE, or the like may reduce interference with other (wireless) electronic equipment operating within the facility, as well as providing greater compatibility across available LTE, 5G, CBRS/PLTE, or similar equipment.

The present systems and methods may reduce interference with other (wireless) equipment operating at a correctional facility, particularly compared with typical wireless network-based (e.g., WI-FI-based) incarcerated individual personal communication and/or media device communication systems and methods. For example, by employing LTE, 5G, CBRS/PLTE, or similar communications for incarcerated individual communications, interference with correctional facility administration WI-FI, correctional facility personnel LTE, 5G, CBRS/PLTE, or similar correctional facility administration or personnel communications, can be avoided.

In accordance with some embodiments, the present systems and methods for cloud access to communications and/or media by an incarcerated individual via a personal communication and/or media device VPN may be backward compatible to support current, traditional incarcerated individual personal communication and/or media devices, such as by installation of the OS (e.g., GOOGLE certified ANDROID OS), incorporating the secured virtual private network for securely connecting this resulting VPN secured personal communication and/or media device directly to the cloud, via a (consumer) wireless communications provider, in accordance with the present systems and methods, as described above.

FIG. 3 is a block diagram of example embodiment 300 of a VPN secured personal communication and/or media device configured to implement various techniques disclosed herein, according to some embodiments. As illustrated, VPN secured personal communication and/or media device 300 includes one or more processors 310A-N coupled to a system memory 320 via bus 330. VPN secured personal communication and/or media device 300 further includes a network interface 340 coupled to bus 330, and one or more I/O controllers 350, which in turn are coupled to touchscreen display 360. VPN secured personal communication and/or media device 300 may be capable of communicating, via a wired connection (e.g., Universal Serial Bus (USB) port) or wireless connection (e.g., cellular wireless, Wi-Fi, Bluetooth, Near Field Communications Link, etc.). Other I/O devices may include, for example, speaker 370, microphone(s) 380, antennas/wireless transducers, phone detection modules, etc.

In various embodiments, VPN secured personal communication and/or media device 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as an, ARM, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In accordance herewith program instructions 325, or the like, may include the VPN secured personal communication and/or media device's OS 390 (e.g., GOOGLE certified ANDROID OS), incorporating secured VPN 395 for securely connecting VPN secured personal communication and/or media device 300 directly to the cloud (145), via a (consumer) wireless communications provider (135), and therethrough with the incarcerated individual communications and/or media cloud access platform (140) in accordance with the present systems and methods, as described above. In some embodiments, other program instructions and/or data may be received, sent, or stored upon different types of computer-accessible media or on similar media separate from system memory 320 or VPN secured personal communication and/or media device 300.

A computer-accessible medium may include any tangible and/or non-transitory storage media or memory media such as electronic, magnetic, or optical media—e.g., disk or CD/DVD-ROM coupled to VPN secured personal communication and/or media device 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices, including network interface 340 or other peripheral interfaces. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the USB standard, for example. In addition, in some embodiments some or all the functionality of bus 330, such as an interface to system memory 320, may be incorporated directly into processor(s) 310A-N, or other system chips.

Network interface 340 may be configured to allow data to be exchanged between VPN secured personal communication and/or media device 300 and other devices attached to a network, such as other computer systems. In various embodiments, network interface 340 may support communication via wired or wireless general data networks, such as any suitable type of Ethernet network, for example; via telecommunications/telephony networks such as the aforedescribed (consumer) wireless communications provider network, or via any other suitable type of network and/or protocol.

I/O controllers 350 may, in some embodiments, enable communications with the display, scanning devices, voice or optical recognition devices, or any other devices suitable for entering or retrieving data by VPN secured personal communication and/or media device 300. Multiple I/O controllers 350 may be present in VPN secured personal communication and/or media device 300. In some embodiments, some I/O devices may be separate from VPN secured personal communication and/or media device 300 and may interact with VPN secured personal communication and/or media device 300 through a wired or wireless connection, such as over network interface 340.

As shown in FIG. 3, system memory 320 may include further program instructions, configured to implement certain embodiments described herein, apps, and the like, and include data storage 335, comprising various data that may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., content, recorded communications, profiles for different modes of operations, etc.). In other embodiments, other or different software elements and data may be included.

A person of ordinary skill in the art will appreciate that VPN secured personal communication and/or media device 300 is merely illustrative and is not intended to limit the scope of the disclosure described herein. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Various elements of the present cloud access to communications and/or media by an incarcerated individual via a virtual private network secured personal communication and/or media device may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
incorporating a secured virtual private network as part of an operating system of a personal communication and/or media device, wherein the operating system is configured to launch the secured virtual private network upon device boot as a persistent always on secure channel to connect only to a wireless carrier designated by an embedded Subscriber Identity/Identification Module (eSIM) configured in the device;
designating the wireless carrier that a resulting virtual private network secured personal communication and/or media device is allowed to connect with and/or communicate through, using the eSIM;
providing the virtual private network secured personal communication and/or media device to an incarcerated individual;
invoking, by the virtual private network secured personal communication and/or media device, the secured virtual private network in response to start of a wireless communications application and/or an application program that makes use of wireless communications;
connecting, by the virtual private network secured personal communication and/or media device, securely directly to the wireless carrier designated by the eSIM, via the secured virtual private network;
terminating, by the wireless carrier designated by the eSIM, communications from, and to, the virtual private network secured personal communication and/or media device to a computing cloud;
synchronizing, by, and/or via, the computing cloud, the communications to an incarcerated individual communications and/or media cloud access platform hosted by the computing cloud; and
processing and/or controlling, by the incarcerated individual communications and/or media cloud access platform, the communications.

2. The method of claim 1, wherein the wireless carrier is a consumer wireless carrier.

3. The method of claim 1, wherein the personal communication and/or media device is a tablet computing device, wearable, or smartphone.

4. The method of claim 1, further comprising launching the secured virtual private network on the virtual private network secured personal communication and/or media device, at or upon boot of the virtual private network secured personal communication and/or media device.

5. The method of claim 1, wherein terminating communications from, and to, the virtual private network secured personal communication and/or media device to the computing cloud further comprises terminating, by the wireless carrier, communications from, and to, the virtual private network secured personal communication and/or media device to a computing cloud local zone or to a content delivery network point-of-presence.

6. The method of claim 5, wherein synchronizing the communications to the incarcerated individual communications and/or media cloud access platform further comprises synchronizing, by the local zone, the content delivery network point-of-presence and/or the computing cloud, the communications from the local zone or content delivery network point-of-presence to the incarcerated individual communications and/or media cloud access platform.

7. The method of claim 1, wherein terminating communications from, and to, the virtual private network secured personal communication and/or media device to the computing cloud further comprises terminating, by the wireless carrier, communications from, and to, the virtual private network secured personal communication and/or media device to a wireless carrier network endpoint in the computing cloud.

8. The method of claim 7, wherein synchronizing the communications to the incarcerated individual communications and/or media cloud access platform further comprises synchronizing, by and/or via the computing cloud, the communications from the wireless carrier network endpoint in the computing cloud to the incarcerated individual communications and/or media cloud access platform.

9. The method of claim 1, wherein terminating communications from, and to, the virtual private network secured personal communication and/or media device to the computing cloud further comprises terminating, by the wireless carrier, communications from, and to, the virtual private network secured personal communication and/or media device directly to the incarcerated individual communications and/or media cloud access platform.

10. The method of claim 1, wherein processing and/or controlling the communications further comprises blocking or allowing a communication, based at least in part on at least one of:

an identity of an incarcerated individual that the communication is from and/or to;

a party the communication is from and/or to;

a correctional facility status of the incarcerated individual that the communication is from and/or to;

one or more rules or regulations of the correctional facility; and funds in a communications account of the incarcerated individual or other communication party.

11. The method of claim 1, wherein processing and/or controlling the communications further comprises monitoring and/or recording a communication.

12. A virtual private network secured personal incarcerated individual communication and/or media device comprising:

an operating system that incorporates a secured virtual private network, wherein the operating system is configured to launch the secured virtual private network upon device boot as a persistent always on secure channel to connect only to a wireless carrier designated by an embedded Subscriber Identity/Identification Module (eSIM) configured in the device;

a designation, configured in the eSIM, of the wireless carrier that the virtual private network secured incarcerated individual personal communication and/or media device is allowed to connect with and/or communicate through, wherein the wireless carrier designated by the eSIM is configured to terminate communications from, and to, the device, and wherein the virtual private network secured personal incarcerated individual communication and/or media device is configured to:

invoke the secured virtual private network in response to start of a wireless communications application and/or an application program that makes use of wireless communications; and connect securely directly to the wireless carrier, via the secured virtual private network.

13. The virtual private network secured personal incarcerated individual communication and/or media device of claim 12, wherein the virtual private network secured personal incarcerated individual communication and/or media device is a tablet computing device, a wearable, or a smartphone.

14. The virtual private network secured personal incarcerated individual communication and/or media device of claim 12, wherein the wireless carrier designated by the eSIM is configured to terminate communications from, and to, the device, to one of: a computing cloud, or a wireless carrier network endpoint.

15. An incarcerated individual communications and/or media access system comprising:

a virtual private network secured personal incarcerated individual communication and/or media device comprising:

an operating system that incorporates a secured virtual private network, wherein the operating system is configured to launch the secured virtual private network upon device boot as a persistent always on secure channel to connect only to a wireless carrier designated by an embedded Subscriber Identity/Identification Module (eSIM) configured in the device; and a designation, configured in the eSIM, of the wireless carrier that the virtual private network secured incarcerated individual personal communication and/or media device is allowed to connect with and/or communicate through, wherein the wireless carrier designated by the eSIM is configured to terminate communications from, and to, the device to a computing cloud, and wherein the virtual private network secured personal incarcerated individual communication and/or media device is configured to:

invoke the secured virtual private network in response to start of a wireless communications application and/or an application program that makes use of wireless communications; and connect securely directly to the wireless carrier, via the secured virtual private network; and an incarcerated individual communications and/or media cloud access platform hosted by the computing cloud, the incarcerated individual communications and/or media cloud access platform configured to:

receive from the wireless carrier, communications terminated by the wireless carrier from, and to, the virtual private network secured personal communication and/or media device; and process and/or control the communications.

16. The incarcerated individual communications and/or media access system of claim 15, wherein the wireless carrier is a consumer wireless carrier.

17. The incarcerated individual communications and/or media access system of claim 15, wherein the virtual private network secured personal incarcerated individual communication and/or media device is a tablet computing device, a wearable, or a smartphone.

18. The incarcerated individual communications and/or media access system of claim 15, wherein the communications terminated by the wireless carrier from, and to, the virtual private network secured personal communication and/or media device are terminated, by the wireless carrier to a wireless carrier network endpoint.

19. The incarcerated individual communications and/or media access system of claim 15, wherein the communications terminated by the wireless carrier from, and to, the virtual private network secured personal communication and/or media device are terminated, by the wireless carrier to a local zone of the computing cloud or to a content delivery network point-of-presence, and wherein the computing cloud synchronizes the communications to the incarcerated individual communications and/or media cloud access platform by the local zone, the content delivery network point-of-presence and/or the computing cloud synchronizing the communications from the local zone or content delivery network point-of-presence to the incarcerated individual communications and/or media cloud access platform.

20. The incarcerated individual communications and/or media access system of claim 15, wherein the communications terminated by the wireless carrier from, and to, the virtual private network secured personal communication and/or media device are terminated, by the wireless carrier to a wireless carrier network endpoint in the computing cloud, and wherein the computing cloud synchronizes the communications to the incarcerated individual communications and/or media cloud access platform from the wireless carrier network endpoint.

21. The incarcerated individual communications and/or media access system of claim 15, wherein the incarcerated individual communications and/or media cloud access platform is further configured to process and/or control the communications, based at least in part on:

an identity of an incarcerated individual that the communication is from and/or to;

a party the communication is from and/or to;

a correctional facility status of the incarcerated individual that the communication is from and/or to;

one or more rules or regulations of the correctional facility; and funds in a communications account of the incarcerated individual or other communication party.

22. The incarcerated individual communications and/or media access system of claim 15, wherein the processing and/or controlling of the communications further comprises monitoring a communication.

* * * * *